US009727950B2

(12) United States Patent
Esaki (10) Patent No.: US 9,727,950 B2
(45) Date of Patent: Aug. 8, 2017

(54) NOISE-REDUCTION PROCESSING DEVICE (71) Applicant: OLYMPUS CORPORATION, Shibuya-ku, Tokyo (JP)

(72) Inventor: Hisumi Esaki, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/938,448

(22) Filed: Nov. 11, 2015

(65) Prior Publication Data
US 2016/0063681 A1    Mar. 3, 2016

Related U.S. Application Data (63) Continuation of application No. PCT/JP2014/062032, filed on Apr. 30, 2014.

(30) Foreign Application Priority Data

May 16, 2013 (JP) .................................. 2013-104242

(51) Int. Cl.
*G06K 9/00* (2006.01)
*G06T 5/00* (2006.01)
(Continued)

(52) U.S. Cl.
CPC .............. *G06T 5/00* (2013.01); *G06K 9/4604* (2013.01); *G06K 9/4671* (2013.01);
(Continued)

(58) Field of Classification Search
CPC .. G06T 5/00; G06T 5/002; G06T 5/20; G06T 7/0085; G06T 2207/20182;
(Continued)

(56) References Cited

U.S. PATENT DOCUMENTS 5,708,693 A * 1/1998 Aach ....................... G06T 5/002
378/62
8,358,867 B1 * 1/2013 Kass ....................... G06T 5/002
382/266
(Continued)

FOREIGN PATENT DOCUMENTS

| JP | 2003132352 A | 5/2003 |
| JP | 2004214756 A | 7/2004 |
| JP | 2006221221 A | 8/2006 |
| JP | 2008293425 A | 12/2008 |
| JP | 2009145991 A | 7/2009 |

OTHER PUBLICATIONS

International Search Report (ISR) dated Jul. 8, 2014 issued in International Application No. PCT/JP2014/062032.

*Primary Examiner* — Jonathan S Lee
(74) *Attorney, Agent, or Firm* — Holtz, Holtz & Volek PC (57) ABSTRACT

A noise-reduction processing device including: a part that calculates an edge strength indicating the edge amount at the pixel of interest based on the pixel of interest and surrounding pixels that surround the pixel of interest; a part that discriminates the edge direction at the pixel of interest; a first filter-processing part that subjects the pixel of interest to smoothing processing along a direction that is based on a direction-discrimination result and outputs a first filter-processing result; a second filter-processing part that subjects the pixel of interest to smoothing processing producing a lower low-pass effect than that of the first filter-processing part and outputs a second filter-processing result and a part that synthesizes the first and second filter-processing results, with the ratio of the first filter-processing result increased as the edge strength becomes higher and the ratio of the second filter-processing result increased as the edge strength becomes lower.

5 Claims, 7 Drawing Sheets (51) Int. Cl.
*G06T 5/20* (2006.01)
*H04N 1/409* (2006.01)
*H04N 5/14* (2006.01)
*H04N 5/213* (2006.01)
*G06K 9/46* (2006.01)
*G06K 9/62* (2006.01)

(52) U.S. Cl.
CPC ............ *G06K 9/6215* (2013.01); *G06T 5/002* (2013.01); *G06T 5/20* (2013.01); *H04N 1/409* (2013.01); *H04N 5/142* (2013.01); *H04N 5/213* (2013.01); *G06K 2009/4666* (2013.01); *G06T 2207/20024* (2013.01); *G06T 2207/20182* (2013.01); *G06T 2207/20192* (2013.01)

(58) Field of Classification Search
CPC ........ G06T 2207/20192; G06K 9/4604; G06K 9/4671; G06K 9/6215; H04N 1/409; H04N 5/142; H04N 5/213
See application file for complete search history.

(56) References Cited

U.S. PATENT DOCUMENTS

| | | | |
|---|---|---|---|
| 2004/0008901 A1* | 1/2004 | Avinash | G06T 3/4007 382/260 |
| 2004/0190787 A1 | 9/2004 | Nakami | |
| 2008/0292204 A1* | 11/2008 | Itoh | G06T 7/0085 382/266 |
| 2009/0226085 A1* | 9/2009 | Shiraishi | H04N 1/58 382/167 |
| 2009/0279808 A1* | 11/2009 | Shiraishi | G06T 5/002 382/275 |
| 2012/0314946 A1* | 12/2012 | Nomura | G06T 5/002 382/167 |
| 2014/0193094 A1* | 7/2014 | Shin | G06T 5/20 382/264 |
| 2015/0312442 A1* | 10/2015 | Higashi | H04N 1/409 382/266 |
| 2016/0117807 A1* | 4/2016 | Matsumoto | G06T 5/008 382/261 |
| 2016/0286080 A1* | 9/2016 | Hayashi | H04N 1/393 |

* cited by examiner

NOISE-REDUCTION PROCESSING DEVICE

CROSS-REFERENCE TO RELATED APPLICATIONS

This is a continuation of International Application PCT/JP2014/062032, with an international filing date of Apr. 30, 2014, which is hereby incorporated by reference herein in its entirety.

This application is based on Japanese Patent Application No. 2013-104242, filed on May 16, 2013, the contents of which are incorporated herein by reference.

TECHNICAL FIELD

The present invention relates to a noise-reduction processing device that performs noise-reduction processing on an image.

BACKGROUND ART

Discriminating an edge direction at each pixel of an image allows the subsequent image processing steps, for example, denoising, to be simplified while maintaining structural attributes of the image; therefore, Japanese Unexamined Patent Application, Publication No. 2008-293425 (PTL 1) has been proposed as an example of a technique relating to edge-direction discrimination.

Specifically, PTL 1 discloses a denoising device in which an input image signal is subjected to multiresolution conversion to generate a plurality of band image signals that have frequency bands different from each other, and a first image signal that includes information about the frequency bands of the band image signals and frequencies lower than the frequency bands and a second image signal that includes information about frequencies lower than the frequency bands of the band image signals are used to discriminate the directions of edge components in the band image signals and also to denoise the band image signals according to the directions of edge components.

CITATION LIST

Patent Literature

{PTL 1} Japanese Unexamined Patent Application, Publication No. 2008-293425

SUMMARY OF INVENTION

Technical Problem

The present invention provides a noise-reduction processing device that reduces patterned noise on a flat portion while maintaining an edge portion even when the amount of noise is high.

Solution to Problem

In order to achieve the above-described object, the present invention provides the following solutions.

One aspect of the present invention is a noise-reduction processing device including: an edge-strength calculation part that calculates, for each pixel of an input image, an edge strength indicating an edge amount at a pixel of interest on the basis of the pixel of interest and surrounding pixels that surround the pixel of interest; a first direction-discrimination part that discriminates an edge direction at the pixel of interest and that outputs a first direction-discrimination result; a first filter-processing part that subjects the pixel of interest to smoothing processing along a direction that is based on the first direction-discrimination result and that outputs a first filter-processing result; a second filter-processing part that subjects the pixel of interest to smoothing processing producing a lower low-pass effect than that of the first filter-processing part and that outputs a second filter-processing result; and a synthesizing part that synthesizes, according to the edge strength calculated by the edge-strength calculation part, the first filter-processing result and the second filter-processing result, with the ratio of the first filter-processing result increased as the edge strength becomes higher and the ratio of the second filter-processing result increased as the edge strength becomes lower.

BRIEF DESCRIPTION OF DRAWINGS

FIG. 2 is a conceptual diagram showing example filters set by a first processing unit, in the noise-reduction processing device according to the first embodiment of the present invention.

FIG. 6 is a conceptual diagram showing example filters set by a second processing unit, in the noise-reduction processing device according to the modification of the first embodiment of the present invention.

DESCRIPTION OF EMBODIMENTS

First Embodiment

A noise-reduction processing device 1 according to a first embodiment of the present invention will be described below with reference to the drawings.

Figure 1:
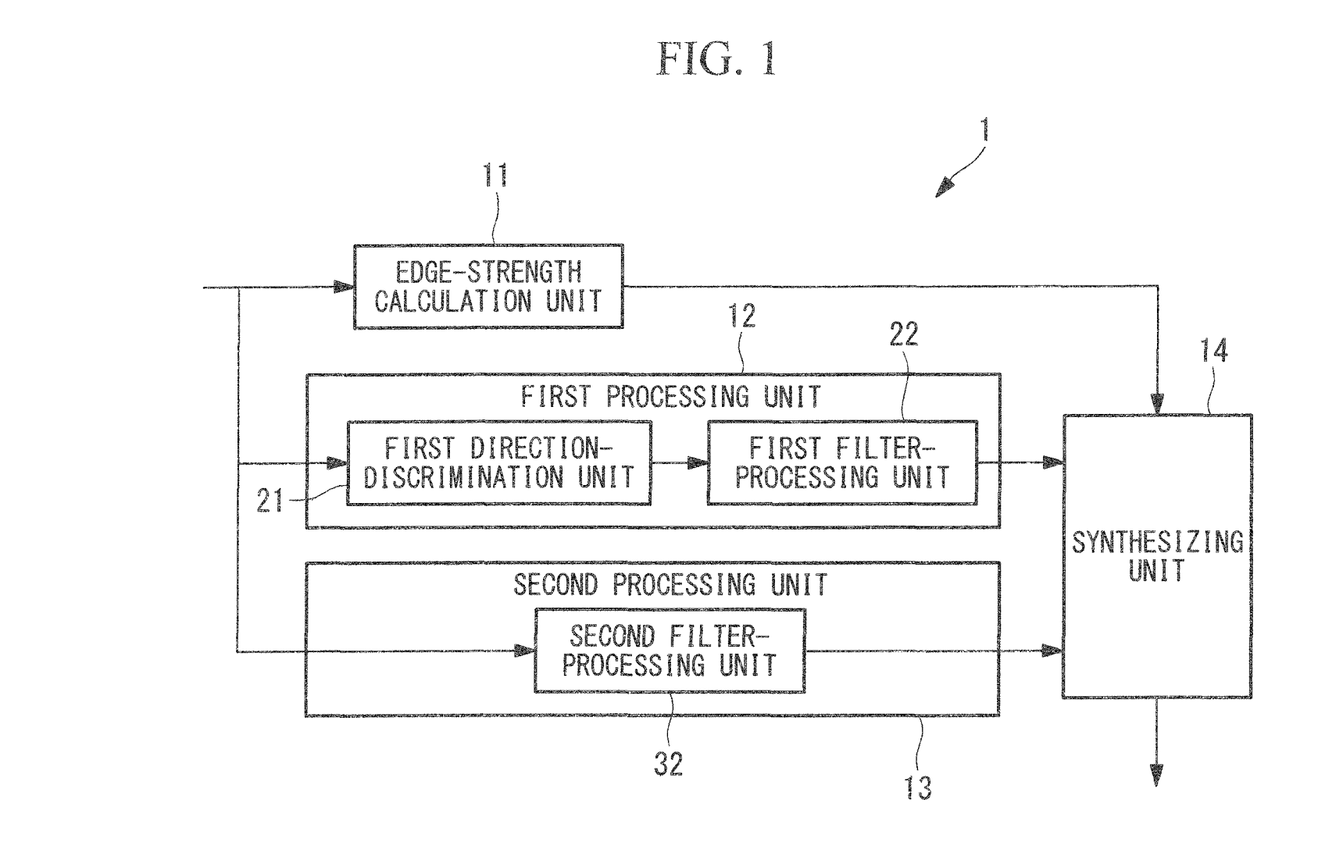
FIG. 1 is a block diagram showing, in outline, the configuration of a noise-reduction processing device according to a first embodiment of the present invention.

As shown in FIG. 1, the noise-reduction processing device 1 includes an edge-strength calculation unit 11 that calculates, for each pixel of an input image, an edge strength that indicates an edge amount at the pixel of interest, a first processing unit 12 that performs, for the input image, filter processing producing a relatively-high low-pass effect, a second processing unit 13 that performs, for the input image, filter processing producing a relatively-low low-pass effect, and a synthesizing unit 14.

The edge-strength calculation unit 11 calculates, for each pixel of the input image, the edge strength that indicates the edge amount at the pixel of interest on the basis of the pixel of interest and a plurality of surrounding pixels that surround the pixel of interest.

More specifically, the edge-strength calculation unit 11 calculates a total average value that is the average value of the pixel values of all pixels included in a predetermined region consisting of the pixel of interest and the surrounding pixels and calculates the average value of the difference absolute values that are the absolute values of the differences between the total average value and the pixel values of the pixels. Furthermore, the maximum value is obtained from among the sums of the absolute values of the differences in pixel value between the corresponding pixels included in 3×3 pixel blocks arrayed along each of the directions that extend radially from the pixel of interest in the predetermined region, each of the sums being calculated for each of the directions. Then, the edge strength is calculated on the basis of at least one of the average value of the difference absolute values and the maximum value.

Figure 3:
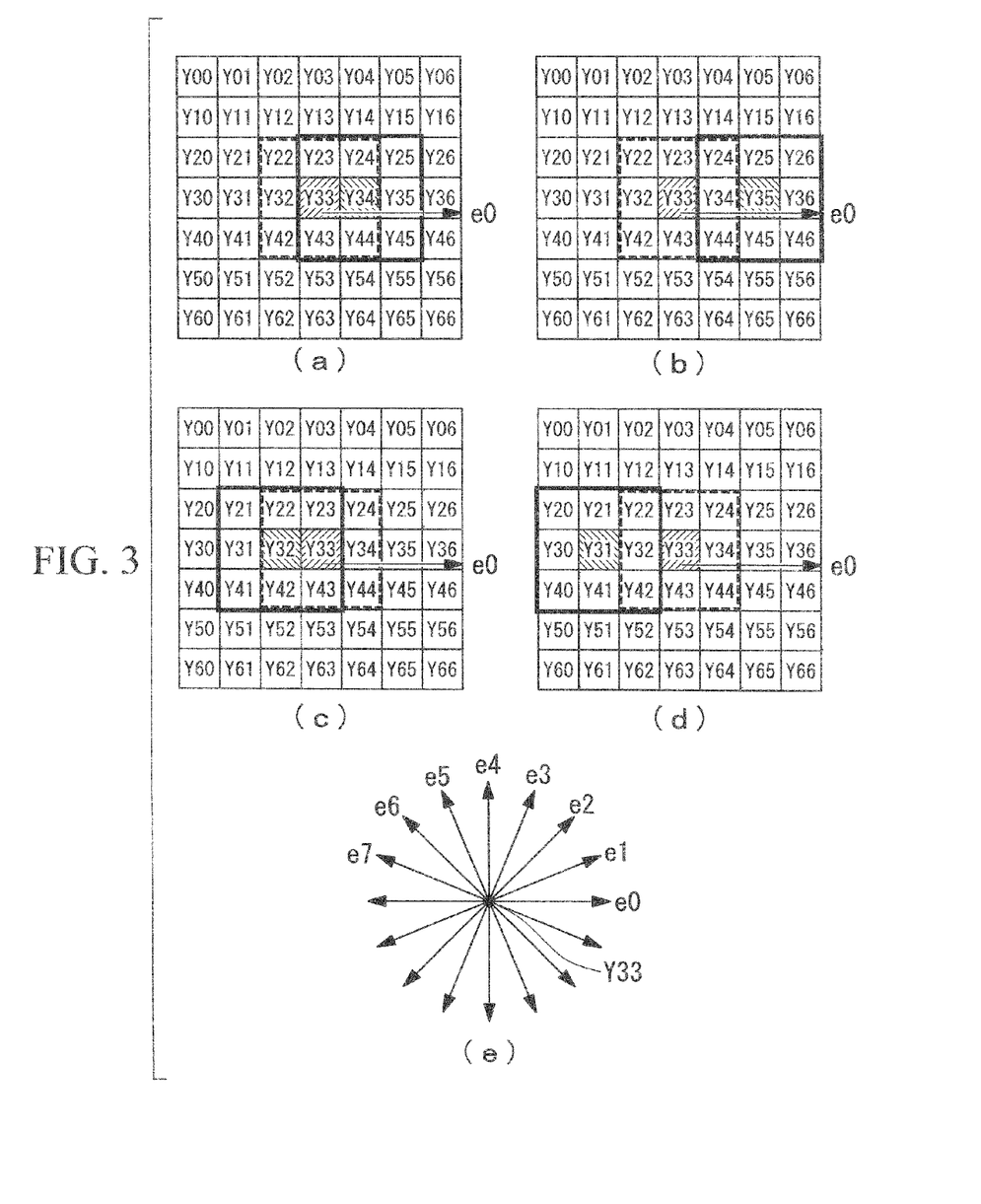
FIG. 3 is a conceptual diagram showing example directions used to calculate representative values with the filters set by the first processing unit, in the noise-reduction processing device according to the first embodiment of the present invention.

FIG. 3 shows an example calculation method for calculating the edge strength in a direction e0. The sum of the absolute values of the differences in pixel value between the corresponding pixels included in a 3×3 pixel block centered on the pixel of interest Y33 and in 3×3 pixel blocks centered on surrounding pixels Y31, Y32, Y34, and Y35 is the value for the direction e0 (see FIG. 3). By using the same method, the values for eight directions e0 to e7 are calculated (see FIG. 3). Note that a description will be given on the assumption that a 7×7 pixel region centered on the pixel of interest Y33, shown in FIG. 2, serves as a predetermined region consisting of the pixel of interest Y33 and the surrounding pixels, which surround the pixel of interest Y33. Note that, although example direction discrimination in which the difference values are calculated on a block basis, thereby increasing the low-pass effect, is shown here, it is possible to use a method for calculating the difference values simply on a pixel basis.

Average Value of Difference Absolute Values

As described above, the edge-strength calculation unit 11 calculates the average value of the difference absolute values in order to calculate the edge strength.

First, the total average value, which is the average value of the pixel values of all pixels included in the predetermined region consisting of the pixel of interest Y33 and the surrounding pixels, is calculated. Specifically, the average value of the pixel values of all pixels Y00 to Y66 is calculated as the total average value. Next, the difference absolute values between the total average value and the pixel values of the respective pixels Y00 to Y66 included in the predetermined region are calculated, and the average value of the difference absolute values is calculated and is set as Sum_sa.

Calculation of Maximum Value of Representative Values

Next, as shown in FIGS. 2 and 3, the edge-strength calculation unit 11 calculates, for each of the eight directions e0 to e7 that extend radially from the pixel of interest Y33 in the predetermined region, the sum of the absolute values, which is obtained by adding the absolute values of the differences in pixel value between the corresponding pixels included in 3×3 pixel blocks arrayed along the direction, as the representative value for the direction. Note that 180°-inverted directions with respect to the directions e0 to e7 are assumed to be minus directions in the same directions, thereby being included in the directions e0 to e7, respectively. In the example shown in FIGS. 2 and 3, the eight directions are set at even intervals.

The edge-strength calculation unit 11 calculates, for each of the directions e0 to e7 in the predetermined region centered on the pixel of interest Y33, the differences in pixel value between the corresponding pixels included in the block centered on the pixel of interest Y33 and in blocks centered on the surrounding pixels and outputs, for each of the directions e0 to e7, the sum of the absolute values of the differences as the representative value for the direction. Equation (1) shows an example calculation of the representative value for the direction e0.

{Math 1}

$$e0 = |Y33 - Y34| + |Y22 - Y23| + |Y23 - Y24| + |Y24 - Y25| + \\ |Y32 - Y33| + |Y34 - Y35| + |Y42 - Y43| + |Y43 - Y44| + \\ |Y44 - Y45| + |Y33 - Y35| + |Y22 - Y24| + |Y23 - Y25| + \\ |Y24 - Y26| + |Y32 - Y34| + |Y34 - Y36| + |Y42 - Y44| + \\ |Y43 - Y45| + |Y44 - Y46| + |Y33 - Y32| + |Y22 - Y21| + \\ |Y23 - Y22| + |Y24 - Y23| + |Y32 - Y31| + |Y34 - Y33| + \\ |Y42 - Y41| + |Y43 - Y42| + |Y44 - Y43| + |Y33 - Y31| + \\ |Y22 - Y20| + |Y23 - Y21| + |Y24 - Y22| + |Y32 - Y30| + \\ |Y34 - Y32| + |Y42 - Y40| + |Y43 - Y41| + |Y44 - Y42|$$
(1)

The edge-strength calculation unit 11 also performs the same calculation for the directions e1 to e7 and sets the maximum value among the representative values for the directions e0 to e7 as Max_sa.

The edge-strength calculation unit 11 sets the value obtained by multiplying Sum_sa by Max_sa, as the edge strength. Note that Sum_sa and Max_sa each have the property that the value thereof is increased when an edge exists at the pixel of interest. In particular, Sum_sa has the property that although it is less prone to false detections due to noise, an edge having a desired thickness cannot be detected. On the other hand, Max_sa has the property that although an edge can be reliably detected, it is more prone to false detections due to noise. Therefore, by using the edge strength obtained by multiplying Sum_sa by Max_sa, it is possible to take advantages of the two values to grasp the presence or absence of an edge at the pixel of interest, the strength of the edge, etc.

Note that the edge-strength calculation unit 11 may set one of Sum_sa and Max_sa as the edge strength.

The first processing unit 12 includes a first direction-discrimination unit 21 and a first filter-processing unit 22.

The first direction-discrimination unit 21 discriminates an edge direction at the pixel of interest and outputs a first direction-discrimination result. Specifically, the first direction-discrimination unit 21 discriminates the edge direction at the pixel of interest on the basis of the region used when the edge-strength calculation unit 11 calculates the edge strength. Specifically, the representative values for all of the directions e0 to e7 are calculated, as in processing performed by the edge-strength calculation unit 11, and the direction having the minimum representative value among the representative values is set as the edge direction at the pixel of interest, namely, the first direction-discrimination result.

The first filter-processing unit 22 subjects the pixel of interest to smoothing processing along the direction based on the first direction-discrimination result. Specifically, the average value of the pixel values of 1×7 pixels in the direction based on the first direction-discrimination result is calculated and is output to the synthesizing unit 14 as a first filter-processing result. The 1×7 pixels used for averaging in each direction are shown in FIG. 2.

The second processing unit 13 includes a second filter-processing unit 32 that subjects the pixel of interest to smoothing processing producing a lower low-pass effect than that of the first filter-processing unit 22 and that outputs a second filter-processing result. In other words, the second filter-processing unit 32 makes the low-pass effect lower than that of the first filter-processing unit 22 by performing smoothing processing in a region that has the pixel of interest at the center and that has a smaller area than that used by the first filter-processing unit 22. Specifically, the second filter-processing unit 32 outputs the average value of the pixel values of all pixels included in a 5×5 pixel region centered on the pixel of interest, to the synthesizing unit 14 as the second filter-processing result.

Note that it is also possible to set, as the second filter-processing result, the average value of the pixel values of pixels whose pixel values have a predetermined difference or less with respect to the pixel value of the pixel of interest, for example.

According to the edge strength calculated by the edge-strength calculation unit 11, the synthesizing unit 14 synthesizes the first filter-processing result and the second filter-processing result, with the ratio of the first filter-processing result increased as the edge strength becomes higher and the ratio of the second filter-processing result increased as the edge strength becomes lower.

The synthesizing unit 14 can also set a threshold in advance, can set the ratio of the second filter-processing result to zero when the edge strength is larger than the threshold, and can set the ratio of the first filter-processing result to zero when the edge strength is smaller than the threshold. In that case, the synthesizing unit 14 practically adopts one of the first filter-processing result and the second filter-processing result selectively on the basis of the threshold.

Furthermore, a plurality of thresholds can be set in the synthesizing unit 14. For example, in a case in which two thresholds, i.e., a first threshold and a second threshold (it is assumed that the first threshold is smaller than the second threshold), are set, the second filter-processing result is adopted when the edge strength is equal to or smaller than the first threshold, and, when the edge strength falls within a range between the first threshold and the second threshold, synthesizing is performed with the ratio of the first filter-processing result increased as the edge strength becomes higher. Then, when the edge strength is equal to or larger than the second threshold, the first filter-processing result can be adopted.

Figure 4:
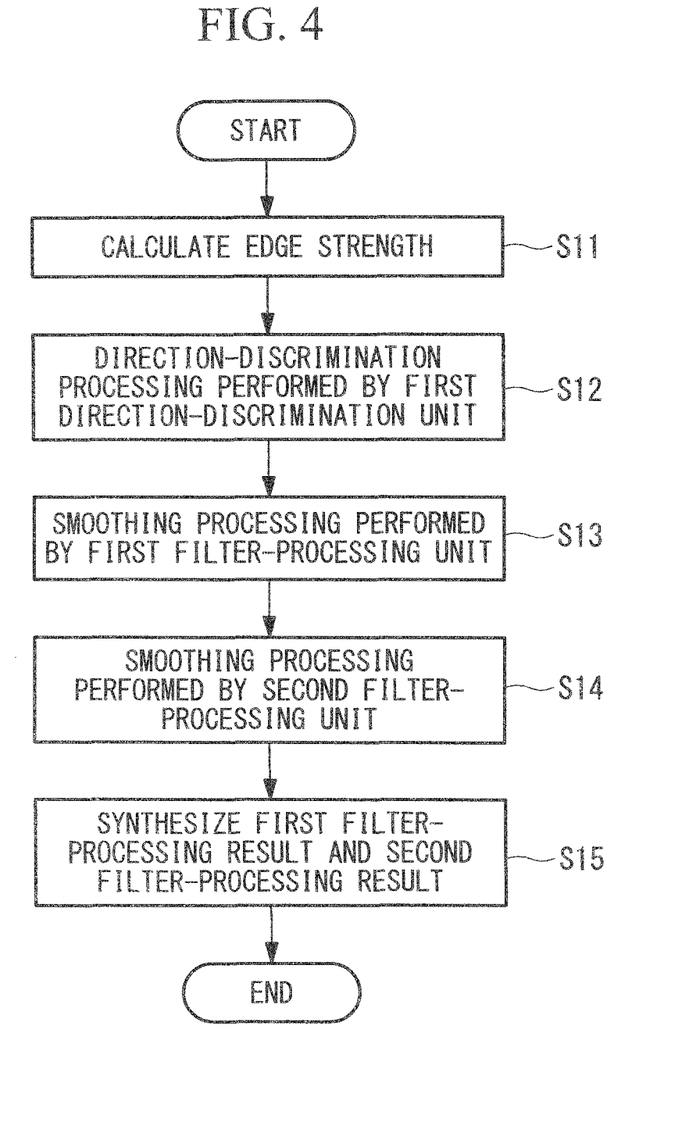
FIG. 4 is a flowchart for discriminating an edge direction at the pixel of interest, in the noise-reduction processing device according to the first embodiment of the present invention.

Next, the operation of the thus-configured noise-reduction processing device 1 will be described by following the flowchart shown in FIG. 4. Note that a description will be given below on the assumption that the first processing unit 12 uses a 7×7 pixel filter, and the second processing unit 13 uses a 5×5 pixel filter.

In order to reduce noise of an input image by using the noise-reduction processing device 1 of this embodiment, the pixel of interest, to be processed, is specified, and the edge strength at the pixel of interest is calculated in Step S11. Specifically, the edge-strength calculation unit 11 specifies a 7×7 pixel region centered on the pixel of interest Y33 and calculates the average value of the difference absolute values between the total average value in the region and the pixel values of the pixels Y00 to Y66 included in the region. Furthermore, the differences between the pixel of interest Y33 and the surrounding pixels are calculated for each of the directions e0 to e7 in the above-specified region, and the sum of the absolute values of the differences is calculated for each of the directions as a representative value for that direction. Then, the edge strength is calculated on the basis of the maximum value among such representative values and the above-calculated average value of the difference absolute values.

Next, in Step S12, the first direction-discrimination unit 21 of the first processing unit 12 outputs the direction having the minimum value among the representative values for the directions e0 to e7 in the 7×7 pixel region centered on the pixel of interest Y33, the representative values being calculated by the edge-strength calculation unit 11, to the first filter-processing unit 22 as the first direction-discrimination result.

In Step S13, the first filter-processing unit 22 calculates the average value of the pixel values of 1×7 pixels in the direction based on the first direction-discrimination result and outputs the average value to the synthesizing unit 14 as the first filter-processing result.

In the next Step S14, the second filter-processing unit 32 of the second processing unit 13 specifies a 5×5 pixel region centered on the pixel of interest Y33, performs smoothing processing by calculating the average value of the pixel values of all pixels included in this region, and outputs the average value to the synthesizing unit 14 as a processing result.

In Step S15, according to the edge strength calculated by the edge-strength calculation unit 11, the synthesizing unit 14 synthesizes the first filter-processing result and the second filter-processing result, with the ratio of the first filter-processing result increased as the edge strength becomes higher and the ratio of the second filter-processing result increased as the edge strength becomes lower.

In this way, according to this embodiment, the edge strength is calculated for the pixel of interest from the values having different properties, thereby accurately grasping the property of an edge at the pixel of interest. Then, the two processing units, which produce different low-pass effects, namely, different denoising effects, subject the input image to processing, and the processing results are synthesized according to the edge strength at the pixel of interest, thereby making it possible to use an appropriate filter-processing result according to each pixel in the input image. Therefore, even when the amount of noise is high, patterned noise on a flat portion can be reduced while maintaining an edge portion.

Furthermore, the first filter-processing unit performs filter processing along the direction based on the first direction-discrimination result, thus making it possible to detect an edge gradient with accuracy, and the second filter-processing unit does not depend on the direction, thus making it possible to effectively reduce patterned noise particularly on a flat portion.

Modification

In the above-described first embodiment, although a description has been given of an example case in which the second filter-processing unit performs smoothing processing without using the direction discrimination result, thus performing filter processing independent of the direction, processing of the second filter-processing unit is not limited thereto, and, for example, it is possible to adopt a configuration in which the second filter-processing unit also performs filter processing using the direction discrimination result.

Figure 5:
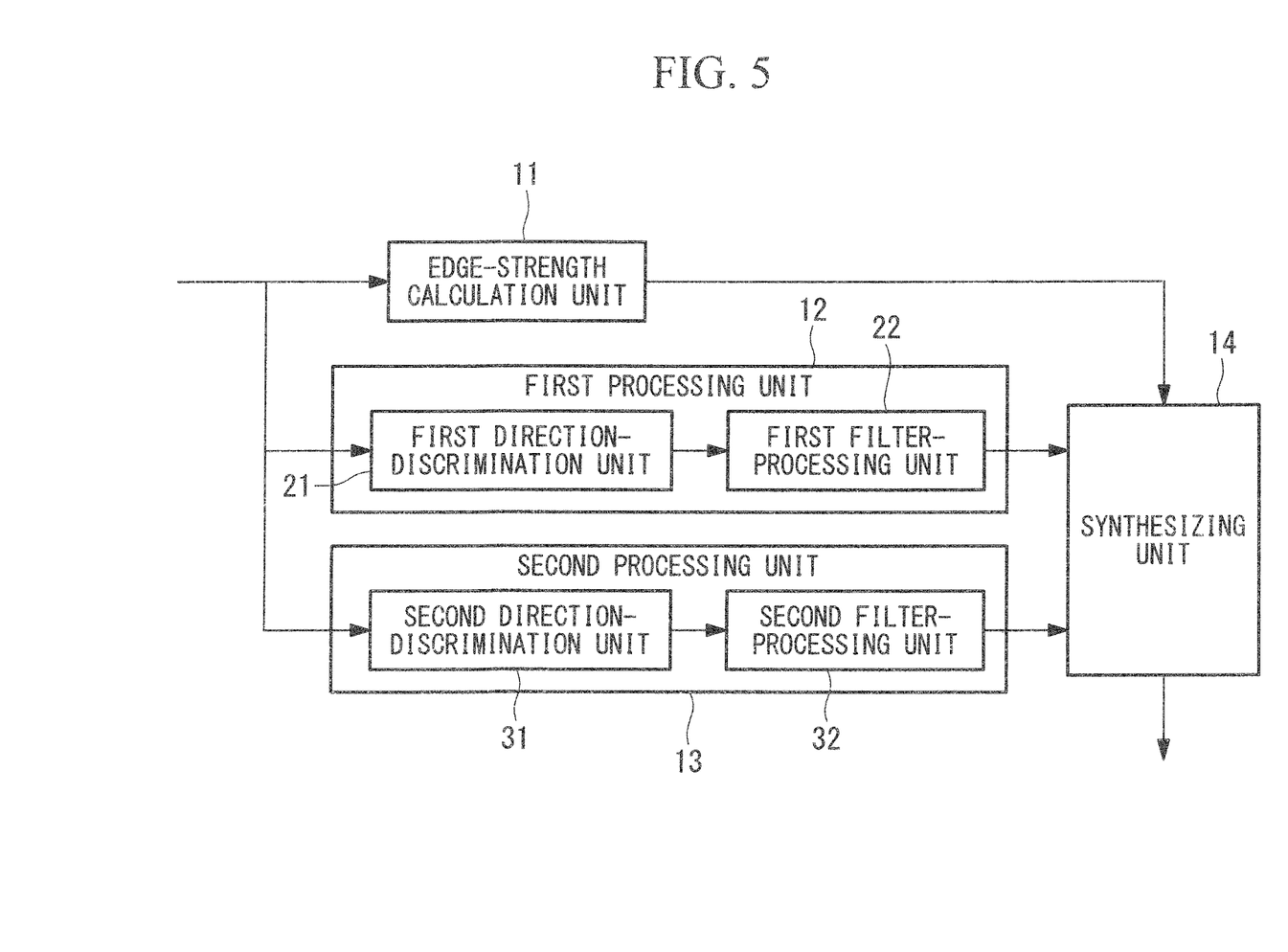
FIG. 5 is a block diagram showing, in outline, the configuration of a noise-reduction processing device according to a modification of the first embodiment of the present invention.

In that case, as shown in FIG. 5, a second direction-discrimination unit 31 is provided at the stage prior to the second filter-processing unit 32 in the second processing unit 13. The second direction-discrimination unit 31 performs direction discrimination by using a 5×5 pixel region centered on the pixel of interest Y33, as shown in FIG. 6, in order to make the low-pass effect lower than that of processing performed in the first direction-discrimination unit 21.

Therefore, on the basis of the 5×5 pixel region centered on the pixel of interest Y33, shown in FIG. 6, the second direction-discrimination unit 31 calculates the sum of the absolute values by adding the absolute values of the differences in pixel value between the pixel of interest and the surrounding pixels, as the representative value for each of the directions e0 to e7, and sets the direction having the minimum value among such representative values for the directions, as the edge direction at the pixel of interest, i.e., a second direction-discrimination result.

Note that the representative values are calculated according to the following equations.

Math 2

$$e0 = |Y22-Y20| + |Y22-Y21| + |Y22-Y23| + |Y22-Y24| \quad (2)$$

$$e1 = |Y22-Y30| + |Y22-Y21| + |Y22-Y23| + |Y22-Y14| \quad (3)$$

$$e2 = |Y22-Y40| + |Y22-Y31| + |Y22-Y13| + |Y22-Y04| \quad (4)$$

$$e3 = |Y22-Y41| + |Y22-Y32| + |Y22-Y12| + |Y22-Y03| \quad (5)$$

$$e4 = |Y22-Y42| + |Y22-Y32| + |Y22-Y12| + |Y22-Y02| \quad (6)$$

$$e5 = |Y22-Y43| + |Y22-Y32| + |Y22-Y12| + |Y22-Y01| \quad (7)$$

$$e6 = |Y22-Y44| + |Y22-Y33| + |Y22-Y11| + |Y22-Y00| \quad (8)$$

$$e7 = |Y22-Y34| + |Y22-Y23| + |Y22-Y21| + |Y22-Y10| \quad (9)$$

The second filter-processing unit 32 subjects the pixel of interest to smoothing processing along the direction based on the second direction-discrimination result. Specifically, the average value of the pixel values of 1×5 pixels in the direction based on the second direction-discrimination result is calculated and is output to the synthesizing unit 14 as a second filter-processing result. The 1×5 pixels used for averaging in each direction are shown in FIG. 6.

According to the edge strength calculated by the edge-strength calculation unit 11, the synthesizing unit 14 synthesizes the first filter-processing result and the second filter-processing result, with the ratio of the first filter-processing result increased as the edge strength becomes higher and the ratio of the second filter-processing result increased as the edge strength becomes lower.

According to this modification, the edge strength is calculated for the pixel of interest from the values having different properties, thereby accurately grasping the property of the edge at the pixel of interest. Then, the two processing units, which produce different low-pass effects, namely, different denoising effects, subject the input image to processing. At this time, the first filter-processing unit and the second filter-processing unit, which have different properties for direction discrimination accuracy etc., are used to discriminate the edge direction at the pixel of interest and to perform smoothing processing along the direction.

Then, these processing results are synthesized according to the edge strength at the pixel of interest, thus making it possible to use an appropriate filter-processing result according to each pixel of the input image. Therefore, even when the amount of noise is high, the edge gradient is detected with higher accuracy, thereby making it possible to reduce patterned noise on a flat portion while maintaining an edge portion.

Second Embodiment

A second embodiment of the present invention will be described below.

In this embodiment, reduction processing units and enlargement processing units are provided as band-image generating means for applying multiresolution decomposition to the original image to generate a plurality of band images that have frequency bands different from each other.

Figure 7:
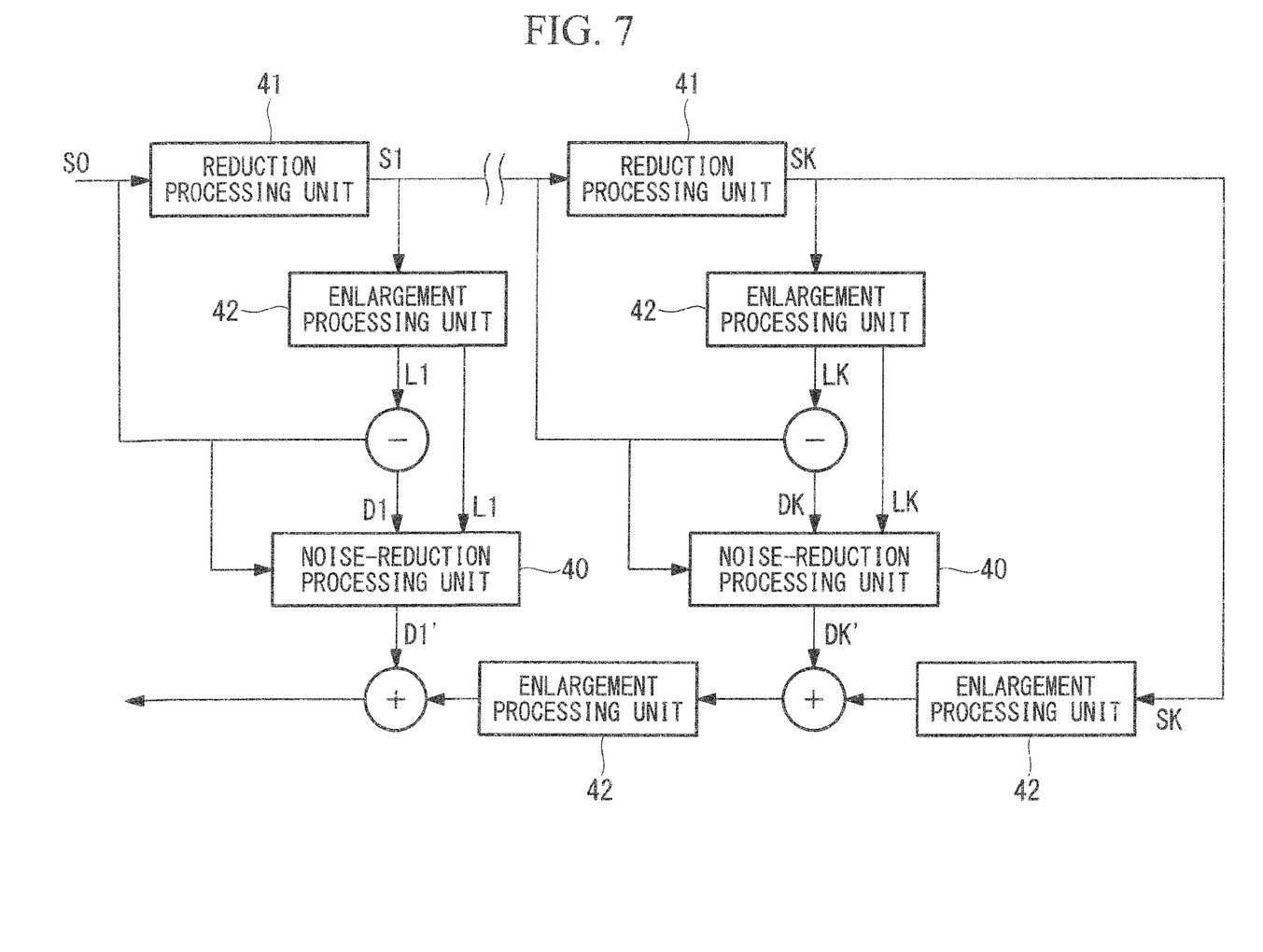
FIG. 7 is a block diagram showing, in outline, the configuration of a noise-reduction processing device according to a second embodiment of the present invention.

Specifically, as shown in FIG. 7, a noise-reduction processing device according to this embodiment is provided with, in addition to noise-reduction processing units 40 that each include an edge-strength calculation unit, a first processing unit, a second processing unit, and a synthesizing unit that constitute the noise-reduction processing device according to the above-described first embodiment or the modification thereof, reduction processing units 41 and enlargement processing units 42 that generate a plurality of band images before the original image is input to the noise-reduction processing units 40.

The original image is repeatedly reduced by the reduction processing units 41, thus obtaining a series of reduced images having different resolutions, the respective reduced images are enlarged by the enlargement processing units 42, and the differences between the enlarged images and the images that are obtained before the last reduction are obtained, thus obtaining band images corresponding to different frequency bands. In the example shown in FIG. 7, an original image S0 is reduced to obtain an image S1, and the image S1 is further reduced to obtain an image S2. By sequentially repeating such processing, a series of reduced images Sk are obtained. Furthermore, the difference between an image L1 that is obtained by enlarging the image S1 to the size before the reduction and the image S0 is calculated, thereby obtaining a band image D1, and the difference between an image L2 that is obtained by enlarging the image S2 to the size before the last reduction and the image S1 is calculated, thereby obtaining a band image D2. By sequentially repeating such processing, band images Dk are obtained.

For example, when images Sk−1, Lk, and Dk are input to the noise-reduction processing unit 40, the image Lk is used as the input image to calculate the edge strength. For direction discrimination performed in the first processing unit, the image Sk−1 is used as the input image, and, for smoothing processing performed in the first processing unit, the image Dk is used as the input image. The same input images are also used in the second processing unit.

The above-described input images are examples, and either the image Sk−1 or the image Lk can be used for direction discrimination performed in the edge-strength calculation unit and the directional-filter-processing unit. It is preferable that the image Lk be used to increase the low-pass effect and that the image Sk−1 be used to maintain fine structures.

According to this embodiment, because direction discrimination and smoothing processing are performed for each of the band images, which are obtained by applying multiresolution decomposition to the original image, it is possible to finely reduce noise existing in each band and to reduce noise on the edge while suppressing blurring, irrespective of the thickness of the edge.

As described above, according to the noise-reduction processing device according to the above-described aspect, the first direction-discrimination part discriminates the edge direction at the pixel of interest of an input image; furthermore, the first filter-processing part performs smoothing processing, and the second filter-processing part performs smoothing processing producing a lower low-pass effect than that of the first filter-processing part, thus outputting a first filter-processing result and a second filter-processing result, respectively. Here, the second filter-processing part produces a lower low-pass effect, namely, a lower denoising effect, than the first filter-processing part, so that the edge-maintaining ability is weak. On the other hand, the first filter-processing part produces a higher low-pass effect, namely, a higher denoising effect, than the second filter-processing part, so that the edge-maintaining ability, i.e., the ability to connect edges that are discontinuous due to the influence of noise, is strong, whereas minute noise on a flat portion is likely to be determined as an edge. Thus, the edge strength that indicates the edge amount at the pixel of interest is calculated by the edge-strength calculation part, and the first filter-processing result and the second filter-processing result are synthesized according to the edge strength.

Accordingly, because the appropriate filter-processing results can be used according to each pixel of an input image, even when the amount of noise is high, patterned noise on a flat portion can be reduced while maintaining an edge portion. Furthermore, the first filter-processing part performs filter processing along the direction based on the first direction-discrimination result, thus making it possible to detect the gradient of an edge with accuracy, and the second filter-processing part does not depend on the direction, thus making it possible to effectively reduce patterned noise particularly on a flat portion.

In the above-described aspect, it is preferable to further include a second direction-discrimination part that produces a lower low-pass effect than the first direction-discrimination part, that discriminates an edge direction at the pixel of interest, and that outputs a second direction-discrimination result, in which the second filter-processing part subjects the pixel of interest to smoothing processing along a direction that is based on the second direction-discrimination result.

By doing so, even when the amount of noise is high, it is possible to detect the gradient of an edge with higher accuracy, to maintain the edge, and also to reduce patterned noise on a flat portion.

In the above-described aspect, it is preferable that the edge-strength calculation part calculate the edge strength on the basis of at least one of: the average value of the difference absolute values that are the absolute values of the differences between a total average value that is the average value of the pixel values of all pixels included in a predetermined region consisting of the pixel of interest and the surrounding pixels, and the pixel values of the respective pixels; and the maximum value among the sums of the absolute values of the differences in pixel value between pixels arrayed along each of directions that extend radially from the pixel of interest in the predetermined region, each of the sums being calculated for each of the directions.

By doing so, the differences in pixel value between the pixel of interest and the surrounding pixels in the predetermined, region are clarified, thus making it possible to calculate the edge strength by reflecting the edge direction and the strength of the edge at the pixel of interest.

In the above-described aspect, it is preferable that the synthesizing part set the ratio of the second filter-processing result to zero when the edge strength is larger than a predetermined threshold and set the ratio of the first filter-processing result to zero when the edge strength is smaller than the threshold.

By doing so, the first filter-processing result or the second filter-processing result is appropriately selected without practically synthesizing both filter-processing results, thus making it possible to make an edge portion unlikely to be blurred and to reduce noise on a flat portion.

In the above-described aspect, it is preferable to further include a band-image generating part that subjects an original image to multiresolution decomposition to generate a plurality of band images having frequency bands different from each other, in which the input image corresponds to the band images generated by the band-image generating part.

By doing so, noise existing in the respective bands can be finely reduced, thus making it possible to reduce noise on an edge while suppressing blurring, irrespective of the thickness of the edge.

REFERENCE SIGNS LIST 1 noise-reduction processing device
11 edge-strength calculation unit
12 first processing unit
13 second processing unit
14 synthesizing unit
21 first direction-discrimination unit
22 first filter-processing unit
31 second direction-discrimination unit
32 second filter-processing unit
40 noise-reduction processing unit
41 reduction processing unit
42 enlargement processing unit

The invention claimed is:

1. A noise-reduction processing device configured to:
perform an edge-strength calculation that calculates, for each pixel of an input image, an edge strength indicating an edge amount at a pixel of interest based on the pixel of interest and surrounding pixels that surround the pixel of interest;
perform a first direction-discrimination that discriminates an edge direction at the pixel of interest and that outputs a first direction-discrimination result;
perform a first filter-processing that subjects the pixel of interest to smoothing processing along a direction that is based on the first direction-discrimination result and that outputs a first filter-processing result;
perform a second filter-processing that subjects the same pixel of interest to smoothing processing producing a lower low-pass effect than that of the first filter-processing and that outputs a second filter-processing result; and
synthesize, according to the calculated edge strength, the first filter-processing result and the second filter-processing result, with a ratio of the first filter-processing result increased as the edge strength becomes higher and a ratio of the second filter-processing result increased as the edge strength becomes lower.

2. The noise-reduction processing device according to claim 1, being further configured to:
perform a second direction-discrimination that produces a lower low-pass effect than the first direction-discrimination, that discriminates an edge direction at the pixel of interest, and that outputs a second direction-discrimination result, wherein the second filter-processing subjects the pixel of interest to smoothing processing along a direction that is based on the second direction-discrimination result.

3. The noise-reduction processing device according to claim 1, wherein the edge-strength calculation calculates the edge strength based on at least one of: an average value of difference absolute values that are absolute values of differences between a total average value that is an average value of pixel values of all pixels included in a predetermined region consisting of the pixel of interest and the surrounding pixels, and the pixel values of the respective pixels; and a maximum value among sums of the absolute values of the differences in pixel value between pixels arrayed along each of directions that extend radially from the pixel of interest in the predetermined region, each of the sums being calculated for each of the directions.

4. The noise-reduction processing device according to claim 1, wherein, in the synthesizing, the ratio of the second filter-processing result is set to zero when the edge strength is larger than a predetermined threshold and the ratio of the first filter-processing result is set to zero when the edge strength is smaller than the threshold.

5. The noise-reduction processing device according to claim 1, being further configured to subject an original image to multiresolution decomposition to generate a plurality of band images having frequency bands different from each other,
wherein the input image corresponds to the band images.

* * * * *